US010345999B2

(12) United States Patent
Doerring

(10) Patent No.: US 10,345,999 B2
(45) Date of Patent: Jul. 9, 2019

(54) MEDIA PRESENTATION MODIFICATION USING AUDIO SEGMENT MARKING

(71) Applicant: OpenTV, Inc., San Francisco, CA (US)

(72) Inventor: Nicholas Daniel Doerring, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 280 days.

(21) Appl. No.: 14/531,689

(22) Filed: Nov. 3, 2014

(65) Prior Publication Data

US 2016/0124596 A1 May 5, 2016

(51) Int. Cl.
*G06F 3/048* (2013.01)
*G06F 3/0484* (2013.01)
*G10L 19/00* (2013.01)
*G11B 27/031* (2006.01)
*H04N 21/454* (2011.01)
(Continued)

(52) U.S. Cl.
CPC ............ *G06F 3/0484* (2013.01); *G10L 19/00* (2013.01); *G11B 27/031* (2013.01); *H04N 21/4394* (2013.01); *H04N 21/4396* (2013.01); *H04N 21/4542* (2013.01); *H04N 21/45457* (2013.01)

(58) Field of Classification Search
CPC .......... H04N 21/4542; H04N 21/4396; H04N 21/4394; H04N 21/45457; G11B 27/031; G10L 19/00; G06F 3/0484
See application file for complete search history.

(56) References Cited

U.S. PATENT DOCUMENTS 7,302,160 B1 * 11/2007 Wells .................. G11B 27/105
386/250
7,877,438 B2 * 1/2011 Schrempp .............. H04H 20/14
709/201
(Continued)

FOREIGN PATENT DOCUMENTS

CN 107111646 A 8/2017
WO WO-2016073217 A1 5/2016

OTHER PUBLICATIONS

"International Application Serial No. PCT/US15/57002, International Search Report dated Feb. 2, 2016", 4 pgs.
(Continued)

*Primary Examiner* — Andrew T Chiusano
(74) *Attorney, Agent, or Firm* — Schwegman Lundberg & Woessner, P.A.

(57) ABSTRACT

Methods and systems of modifying a media presentation are presented. In one example, a first media item including first audio data is played. During that time, a user indication is received. In response to the indication, detection data for a first audio segment of the first audio data is generated. A second media item including second audio data is then played. A second audio segment in the second audio data corresponding to at least a portion of the first audio segment is detected based on the detection data. Whether a location in the second audio segment corresponds to a location in the detection data associated with the user indication is determined. In response to the location in the second audio segment corresponding to the location in the detection data, the playing of the second media item is altered during at least a portion of the second audio segment.

18 Claims, 10 Drawing Sheets

(51) Int. Cl.
*H04N 21/439* (2011.01)
*H04N 21/4545* (2011.01)

(56) References Cited

U.S. PATENT DOCUMENTS

| | | | | |
|---|---|---|---|---|
| 2003/0115587 A1* | 6/2003 | Kendall | ............... | H04H 20/14 725/9 |
| 2006/0245625 A1* | 11/2006 | Tichelaar | ............ | G06F 17/30781 382/124 |
| 2010/0319015 A1* | 12/2010 | Remington | ............ | H04H 20/10 725/19 |
| 2010/0322592 A1* | 12/2010 | Casagrande | ............ | H04N 5/147 386/241 |
| 2011/0096225 A1* | 4/2011 | Candelore | ............ | H04N 5/76 348/384.1 |
| 2012/0042247 A1* | 2/2012 | Harper | ............ | G06Q 30/02 715/716 |
| 2012/0169938 A1* | 7/2012 | Harvey | ............ | H04N 21/454 348/734 |
| 2013/0198215 A1* | 8/2013 | Lee | ............ | G06F 17/30858 707/758 |
| 2013/0283173 A1 | 10/2013 | Harper et al. | | |
| 2014/0086561 A1* | 3/2014 | Kim | ............ | H04N 5/76 386/279 |
| 2014/0089307 A1* | 3/2014 | Garside | ............ | G06F 17/30023 707/736 |
| 2015/0172754 A1* | 6/2015 | Stephens | ............ | H04N 21/4396 725/11 |

OTHER PUBLICATIONS

"International Application Serial No. PCT/US15/57002, Written Opinion dated Feb. 2, 2016", 5 pgs.

"International Application Serial No. PCT/US2015/057002, International Preliminary Report on Patentability dated May 18, 2017", 7 pgs.

"European Application Serial No. 5794685.6, Response filed Dec. 22, 2017 to Communication Pursuant to Rules 161(2) and 162 dated Jun. 12, 2017", 13 pgs.

* cited by examiner

MEDIA PRESENTATION MODIFICATION USING AUDIO SEGMENT MARKING

FIELD

This application relates generally to the field of data processing and, in an example embodiment, to media presentation modification based on audio segment marking or selection.

BACKGROUND

While the availability, quantity, visual resolution, and audio quality of audio and audio/visual media items (e.g., television series episodes, news programs, movies, sporting events, etc.) have all been enhanced greatly year after year, some frustrating aspects of these media items remain. For example, some media content within, or accompanying, the media items, such as commercials, advertisements, television show theme songs, and so on, are often presented repeatedly over multiple media items, possibly many times per day, typically spanning weeks or months. Some such content may be annoying to particular users immediately, while other content may be initially humorous or otherwise interesting to those viewers, only to become tiresome thereafter.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of the embodiments disclosed herein. It will be evident, however, to one skilled in the art that the embodiments may be practiced without these specific details.

Figure 1:
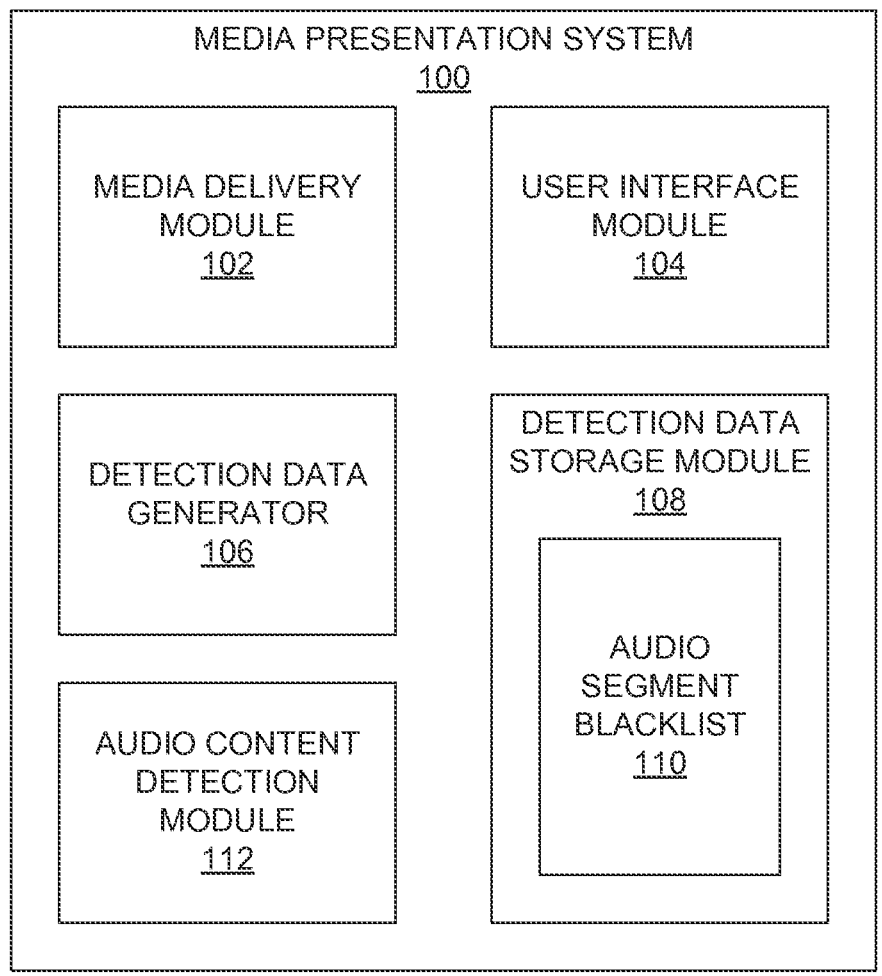
FIG. 1 is a block diagram of an example media presentation system employable for modifying the presentation of a media item using audio segment marking or selection.

FIG. 1 is a block diagram of an example media presentation system 100 employable for presenting media items to a user or viewer. The media items presented may include, but are not limited to, visual or video items, audio items, and audio/visual items. Examples of the media items may include, but are not limited to, television shows, news or documentary programs, sporting events, motion pictures, and audio programs (e.g., podcasts). Such media items may include, or be provided with, commercials, promotional segments, television theme songs, and/or other material that is possibly of a strident, repetitive, or otherwise objectionable nature to at least some viewers or users. In at least some of the embodiments discussed below, the user may select, mark, or otherwise indicate the objectionable content, such as by pressing a remote control button or providing some other type of user input, while the objectionable content is being displayed or otherwise presented to the user. In response to such an indication, the media presentation system 100 may alter the presentation of the selected content, such as, for example, muting the audio, blocking the visual portion, and/or skipping at least a portion of the selected content.

In the example of FIG. 1, the media presentation system 100 may be a standalone device, or may be incorporated within, or communicatively coupled with, another media presentation device, such as, for example, a media gateway, a television set-top box, a personal video recorder, a gaming system, a content streaming device, a television, a desktop computer, a laptop computer, a tablet computer, a smart phone, a personal digital assistant (PDA), or an audio amplification system (e.g., an audio receiver). In at least some embodiments, visual content of the media items may be presented to the user by way of a visual display component, such as, for example, an liquid crystal display (LCD), light-emitting diode (LED) display, a plasma display, a computer monitor, or a touchscreen, while audio content may be provided by way of an audio presentation component, such as audio speakers, audio headphones, or the like. The visual display component and/or the audio presentation component may be incorporated within, or communicatively coupled with, the media presentation system 100 or another device operatively coupled with the media presentation system 100.

The media presentation system 100, as depicted in FIG. 1, may include a media delivery module 102, a user interface module 104, a detection data generator 106, a detection data storage module 108, and an audio content detection module 112. Also, the detection data storage module 108 may be configured to store an audio segment "blacklist" 110, wherein entries of the blacklist 110 include information that may be employed to detect the presence of audio data corresponding to the selected objectionable content, as indicated by a user. In at least some embodiments, the media presentation system 100 may include other components, modules, or devices, including, but not limited to, a user input interface device (e.g., a keyboard, touchpad, joystick, mouse, and so on), a power supply, a communication network interface (e.g., an interface for a wide area network (WAN), a local area network (LAN), a cellular telephone network (e.g., a third-generation (3G) or fourth-generation (4G) network), and/or a Bluetooth® connection), and the like. However, such components are not discussed herein to simplify and focus the discussion provided hereafter. Moreover, one or more of the modules 102-112 may incorporate hardware circuitry and/or one or more hardware processors (e.g., central processing units (CPUs), microprocessors, or microcontrollers) that may employ software or firmware instructions to perform the various operations ascribed to the modules 102-112, as described below. Additionally, the media presentation system 100 may include one or more combinations of the modules 102-112 to render fewer modules, and/or one or more of the modules 102-112 may be further subdivided to render a greater number of modules.

The media delivery module 102 may be configured to present, or "play", media items that include audio data. The media items may be presented to the user as the media items are received at the media presentation system 100, such as by way of a wired and/or wireless communication network (as described above), a terrestrial antenna, a satellite antenna, a coaxial cable, or the like. In some examples, such as those involving broadcast television and other broadcast media, the media delivery module 102 may not determine when each media item begins and/or ends, as multiple media items, or portions thereof, may appear to the media delivery module 102 as a continuous stream of media content. In some examples, the media delivery module 102 may record the received media items to one or more storage media, such as, for example, magnetic disk drives, optical disk drives, non-volatile memory (e.g., flash memory), and so on, and subsequently retrieve the media items from the storage media or memory for presentation to the user at a later time. The media delivery module 102, in some examples, may retrieve the media items from removable media, such as a Compact Disc (CD), Digital Versatile Disc (DVD), a Blu-ray Disc (BD)™, and so on, and then present the media items to the user, such as via a visual display, audio speakers, and so forth, as mentioned above. The media delivery module 102 may also include any circuitry or control logic employed to translate the media items from the format in which they are received into a format usable by the display and/or speakers, or into an intermediate format that may be received by another user presentation component or system.

In at least some examples, the media delivery module 102 may temporarily store or buffer a portion of the audio data of the media items before or while delivering that portion for presentation to the user. The buffered portion may then be characterized and/or captured for the generation of audio detection data in response to a user indication, as described more fully below. Moreover, the media delivery module 102 may perform such buffering continuously to facilitate the capturing and buffering of an entirety of the audio data of a particular media item that is selected or marked by a user.

The user interface module 104 may be configured to receive a user indication of media item content selected or marked by the user for alteration, such as, for example, muting, blanking, and/or skipping. In some embodiments, the user interface module 104 correlates the received user indication with a portion of the media item currently being played or presented to the user. The user interface module 104 may receive the user indication directly by way of a panel button or touchscreen, remotely by way of a remote control device or smart phone, or via any other means of facilitating user input.

The detection data generator 106 may be configured to generate audio detection data for a segment of audio data of a media item in response to receiving the user indication at the user interface module 104. In some embodiments, the audio detection data may include acoustic fingerprint data that characterizes one or more attributes of corresponding audio data of the media item being delivered. In other examples, the audio detection data may include at least some of the actual audio data of the media item being delivered. Other examples of audio detection data may be employed in other embodiments. The amount of audio data being employed to generate the audio detection data may be any determinable length of time (e.g., 30 seconds, one minute, two minutes, etc.). In some examples, the amount of audio data used to generate the audio detection data may be some factor or length of time longer than that associated with a typical commercial or other type of content. For example, if a typical commercial may be one minute long, the amount of audio data used or characterized to generate the audio detection data may be approximately two minutes long, or slightly longer, to allow all of the audio data associated with a commercial to be characterized while allowing the user to indicate the viewing of the commercial at any point during the playing of the commercial.

The detection data generator 106 may also be configured to store the generated audio detection data using the detection data storage module 108. More specifically, the detection data storage module 108 may store the generated audio detection data for subsequent use by the audio content detection module 112 in detecting the same audio data indicated by the user in subsequent media items displayed or presented to the user or viewer. In some embodiments, as described in greater detail below, the stored audio detection data may be modified or replaced with audio detection data generated from audio data of another media item that has been delivered for presentation to the user. In addition, audio detection data for multiple portions of audio data from different media items, as indicated by the user, may be stored in the audio segment blacklist 110 for comparison with audio data of media items subsequently presented to the user. In the example of FIG. 1, the audio segment blacklist 110 is depicted as being stored within the detection data storage module 108. In other embodiments, the audio segment blacklist 110 may be stored elsewhere within, or external to, the media presentation system 100 while remaining accessible by the detection data storage module 108.

The audio content detection module 112 may be configured to employ the audio detection data stored in the audio segment blacklist 110 to detect, in media items being presented or displayed, instances of the content previously indicated by the user. For example, if the audio detection data includes acoustic fingerprint data, the audio content detection module 112 may compare the fingerprint data in the audio segment blacklist 110 against fingerprint data generated for the audio data of the media item currently being presented to the user to detect whether the same content indicated by the user is being presented. For example, the audio content detection module 112 may determine that the audio data currently being presented is the same as the audio segment represented in the audio segment blacklist 110 if the fingerprint data for the two audio content segments, or the audio data for those segments, are the same or correlate within some percentage or amount. If that same content is detected in the currently presented media item, the audio content detection module 112 may then alter the presentation of that media item during at least a portion of the content that was detected. Examples of the alteration may include, but are not limited to, reducing an audio volume, muting, or blanking the portion of the media item corresponding to the detected content.

Figure 2:
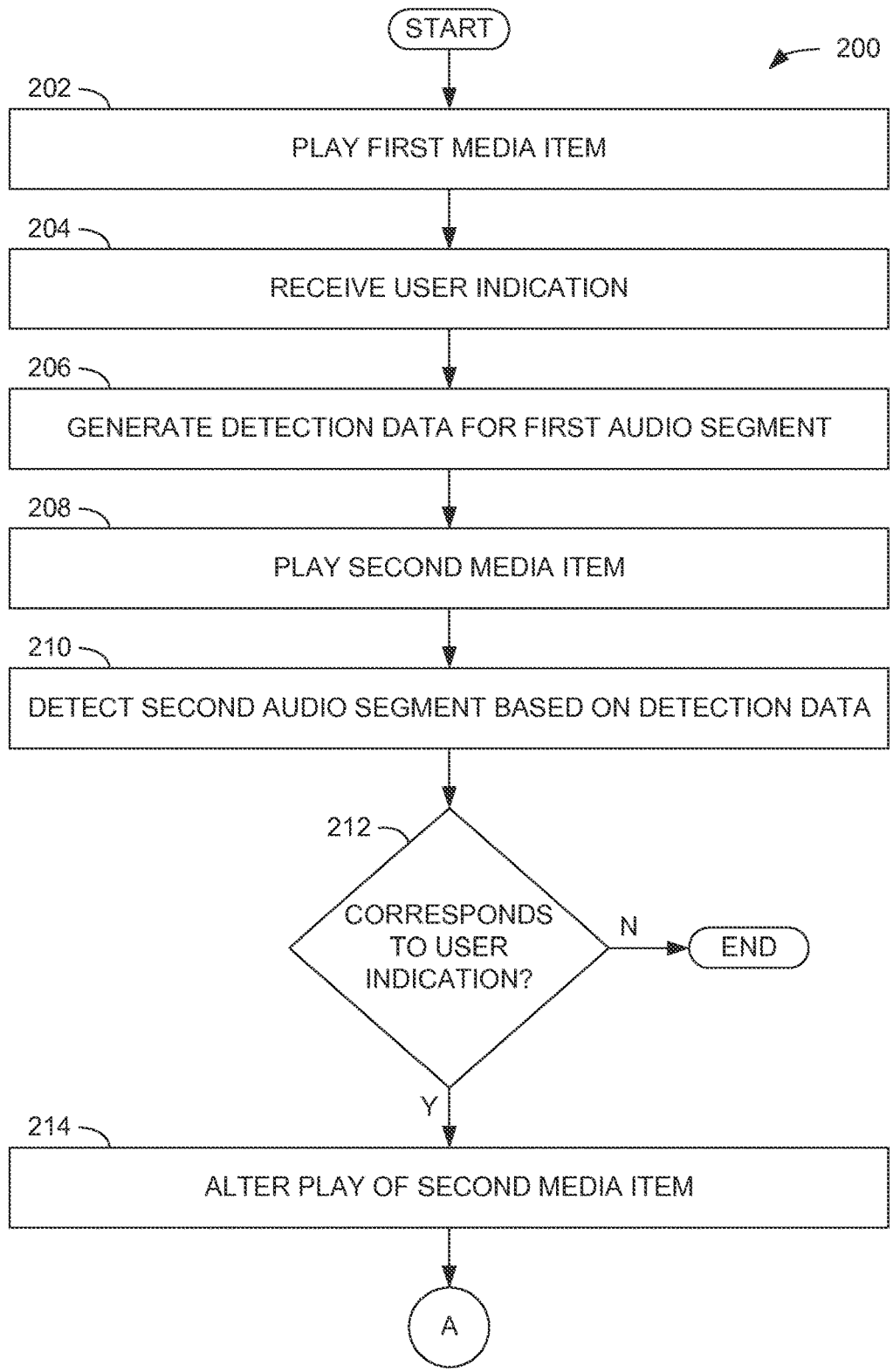
FIGS. 2 and 3 are flow diagrams of example methods of modifying the presentation of a media item, in which initial audio detection data encompasses an entire selected content portion.

FIG. 2 is a flow diagram of an example method 200 of modifying the presentation of a media item. In this example, initial audio detection data that is generated in response to a user indication encompasses a portion of content selected or marked by the user. While the following discussion of the method 200 presumes the use of the media presentation system 100 of FIG. 1, other devices or systems not explicitly discussed herein may also be employed to perform the operations of method 200 in some embodiments.

In the method 200, the media delivery module 102 may play the first media item for presentation to the user (operation 202). For an audio-only media item, such as music from a music channel provided on a cable or satellite television system, music from a radio station, audio from a podcast, and so on, the media delivery module 102 may provide the audio for presentation to the user. For an audio/visual media item, such as a television program, sporting event, motion picture, or the like, the media delivery module 102 may provide both the audio and visual data for presentation to the user. Further, the media delivery module 102 may present the media item to the user "live" as it is received over a network or broadcast communication connection, or well after the media is received as a recorded version of the media item.

During the playing of the first media item, the user interface module 104 may receive a user indication of a content portion of the first media item whose presentation is to be altered (operation 204). As mentioned above, the selected or indicated content portion may be a commercial, television theme song, or some other portion of the first media item that the user is marking for alteration, such as muting or skipping. In some examples, the user provides such an indication by pressing a remote control button, touching a virtual button of a smart phone touchscreen, or some other means of providing input while the selected content is being presented or displayed to the user.

In response to the user selection, the detection data generator 106 may generate audio detection data for a first content segment corresponding to the user indication (operation 206). In one example, the first content segment may be a part of the first media item that begins some predetermined amount of time (e.g., 30 seconds, one minute, etc.) prior to the user indication and extends to that same predetermined amount of time after the user indication. Other parts of the first media item may serve as the first content segment in other examples. As discussed above, the generated detected data may be acoustic fingerprint data for the audio data of the first content segment, the actual audio data of the first content segment, or some other representation of the audio data of the first content segment. As indicated above, the detection data generator 106 may store the generated detection data via the detection data storage module 108.

Afterward, the media delivery module 102 may play a second media item for presentation to the user (operation 208). The second media item may be any media item that is displayable or presentable to the user, including a replay or copy of the first media item. Also, such playing of the second media item (or other media items described below) may occur at any point after the first media item, and may not be the media item immediately following the first media item.

During the playing of the second media item, the audio content detection module 112 may compare the stored detection data against the audio data of the second media item as the audio data is being delivered for presentation to the user. During this comparison, the audio content detection module 112 may detect a second audio segment in the audio data of the second media item based on the stored detection data (operation 210). In one example, the second audio segment may be the part or subset of the first audio segment represented by the stored detection data.

The audio content detection module 112 may further determine whether a location within the second audio segment corresponds to a location of the user indication within the first audio segment (operation 212). In other words, a determination may be made as to whether the second audio segment encompasses a location within the first audio segment, as represented by the stored detection data, which corresponds to the user indication, thus indicating that the second audio segment includes the portion of the first audio segment selected or identified by the user. In one example, the location in the first audio segment corresponding to the user selection may be presumed to be a centrally located position within the first audio segment, as represented by the stored detection data. In other examples, another location or position within the first audio segment may be presumed to correspond with the user indication. In yet other embodiments, the stored detection data may include data that explicitly identifies a location or position within the stored detection data that is associated with the user indication.

Based on the second audio segment encompassing a location within the first audio segment that corresponds to the user indication (operation 212), the audio content detection module 112 may alter, by way of the media delivery module, the playing of the second media item during at least a portion of the second audio segment (operation 214). For example, the audio content detection module 112 may reduce the audio volume, mute, or skip the entirety of the second audio segment. Such reduction may be possible if a sufficient part of the second media item is buffered and analyzed, as discussed above, prior to the presentation of that part of the second media item to the user. In another example, the audio content detection module 112 may alter the portion of the second audio segment beginning with the location corresponding to the user indication, and proceeding to the end of the second audio segment.

While the operations 202 through 214 of FIG. 2, as well as operations of other methods described herein, are shown as occurring in a specific order, concurrent or overlapping execution of those operations, as well as operations of other methods described herein, are also possible. In one example, each of the operations 202 through 214 may be performed for each of multiple user indications of audio portions of one or more media items that a user may want altered (e.g., muted, skipped, and so on). Accordingly, the operations 202 through 214 may be performed on different media items, involving different marked or selected portions of media content, in a parallel, simultaneous, or concurrent fashion.

Figure 3:
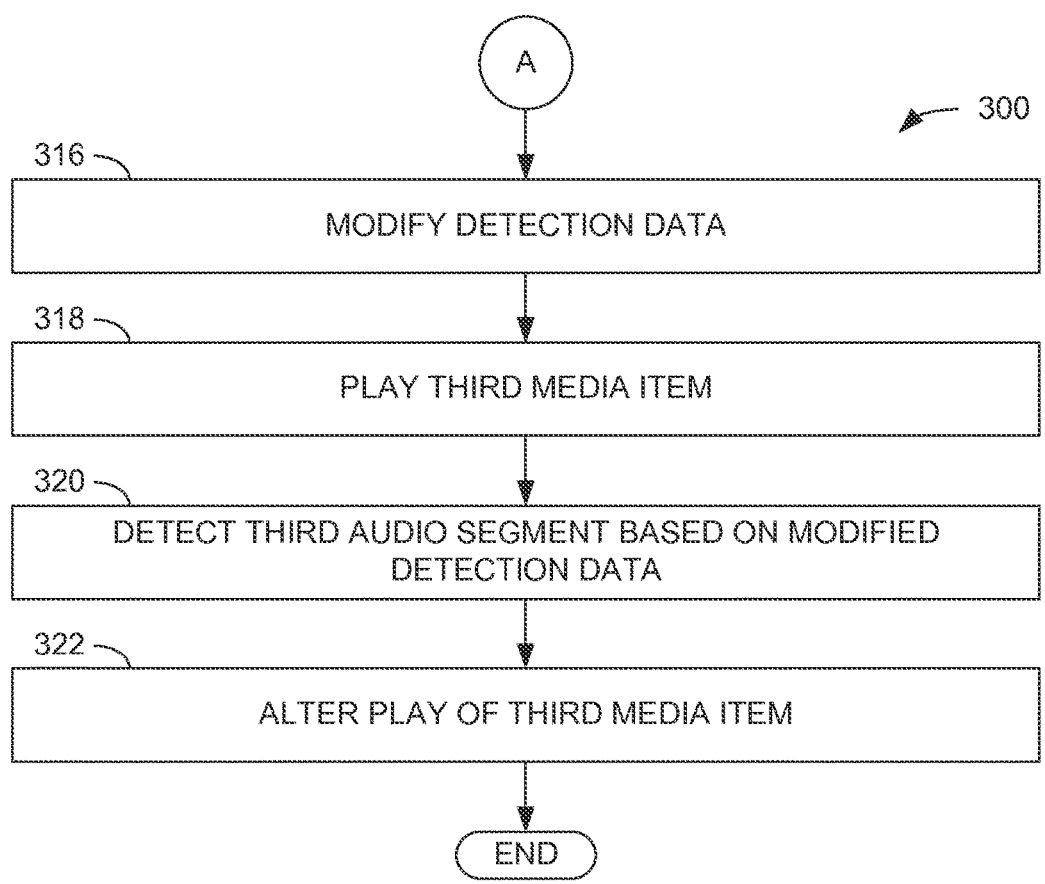

FIG. 3 is a flow diagram of another example method 300 of modifying the presentation of a media item, in which initial audio detection data encompasses an entire content portion selected or indicated by the user. As presented in FIG. 3, the method 300 may be performed after operation 214 of method 200 of FIG. 2. In the method 300, the audio content detection module 112 may employ the second audio segment to modify the stored detection data (operation 316). For example, the audio content detection module 112 may modify the stored detection data by way of trimming the leading and/or trailing ends of the stored detection data to match the second audio segment. Accordingly, the audio content detection module 112 may indicate in some fashion that the modified detection data represents an entirety of the audio data of the user-selected portion of a media item that is to be altered.

Thereafter, the media delivery module 102 may play a third media item for presentation to the user (operation 318). While comparing the modified detection data to the incoming audio data of the third media item, the audio content detection module 112 may detect audio data for a third audio segment that corresponds to the second audio segment (operation 320). Accordingly, the audio content detection module 112 may alter the playing of the third media item during the third audio segment (operation 322). For example, the audio content detection module 112 may reduce the volume level, mute, or skip the entirety of the third audio segment, as the third audio segment may represent the complete portion of the first media item that the user previously marked via the user indication.

Figure 4:
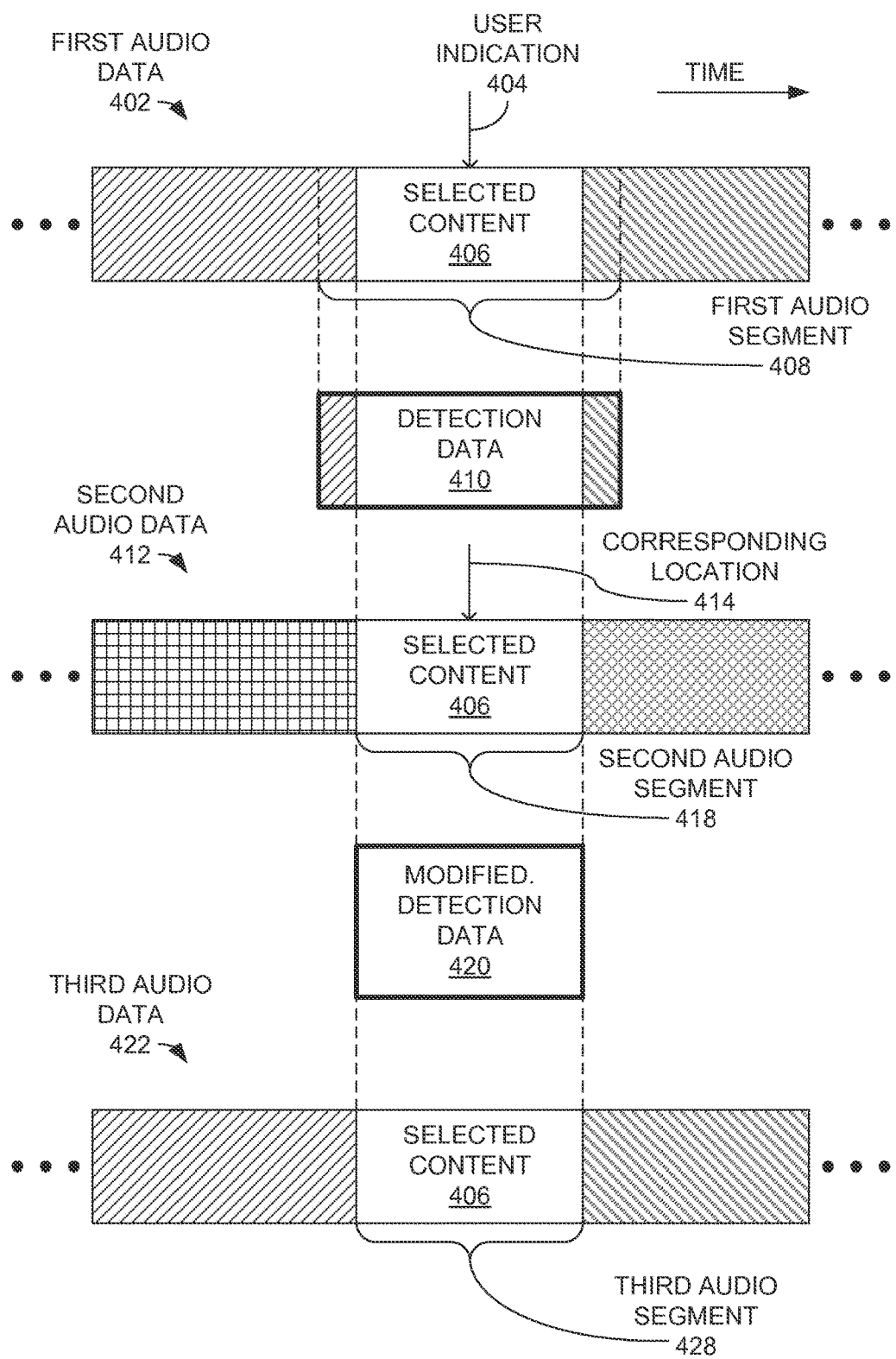
FIG. 4 is a timing diagram depicting the modification of the presentation of a media item based on the example methods of FIGS. 2 and 3.

FIG. 4 is a timing diagram depicting the modification of the presentation of a media item based on the example methods of FIGS. 2 and 3. In FIG. 4, first audio data 402 that is part of a first media item being presented to the user is shown. During the presentation of the first audio data 402, progressing over time from left to right in FIG. 4, a user indication 404 is received during a portion of the first audio data 402 corresponding to selected content 406, such as a commercial, television theme song, or other content portion. In at least some examples, the first media item that includes the first audio data 402 is not modified or altered. Instead, detection data 410 may be generated for a first audio segment 408 identified by the user indication 404. In this example, the first audio segment 408 is centered about a point in time at which the user indication 404 is received, and spans enough time to encompass the selected content 406. In other examples, the length and location of the first audio segment 408 relative to the selected content 406 and the user indication 404 may be different from that illustrated in FIG. 4.

In one example, the detection data 410 includes an acoustic fingerprint of the first audio segment 408. In another embodiment, the detection data 410 includes the audio data of the first audio segment 408. Other types of data representing the first audio segment 408 may be utilized as the detection data 410 in other examples.

Thereafter, the second audio data 412 that is part of a second media item is presented to the user. During the playing of the second audio data 412, the detection data 410 is compared against similar data representing the second audio data 412 as the second audio data 412 is being presented to the user, or is at least being buffered prior to presentation to the user. During this comparison, at least a portion of the detection data 410 matches corresponding data (e.g., audio data, acoustic fingerprint data, etc.) of the selected content 406. In this particular example, the portion of the second audio data 412 corresponding to the selected content 406, including the point in time in the selected content 406 that is associated with the user indication 404, matches a portion of the detection data 410.

In one example, the audio content detection module 112 may confirm that a corresponding location 414 of the second audio segment 416 is associated with a location of the user indication 404 within the detection data 410. Also, in some embodiments, the audio content detection module 112 may verify that the matching portion of the second audio data 412 (e.g., the selected content 406) is completely included within the detection data 410. For example, the audio content detection module 112 may determine that the detection data 410 extends beyond both the beginning and the end of the matching selected content 406, as it appears in the second audio data 412. If such a determination is made, the audio content detection module 112 may then modify (e.g., trim) a beginning and end portions of the detection data 410 so that the extent of the resulting modified detection data 420 matches the extent of the selected content 406. The audio content detection module 112 may also store the modified detection data 420 as an entry in the audio segment blacklist 110 via the detection data storage module 108. In other examples, the original detection data 410 may also have been stored in the audio segment blacklist 110.

Moreover, in response to the confirmation that the second audio segment 418 encompasses or covers the corresponding location 414 related to the point in time associated with the user indication 404, the audio content detection module 112 may alter the presentation of the second media item by, for example, lowering a volume or muting the second audio data 412 beginning at the corresponding location 414 of the second audio segment 418, possibly extending to the end of the second audio segment 418. Moreover, if the detecting of the second audio segment 418 based on the detection data 410 occurs prior to the presentation of the second audio segment 418 to the user, the entirety of the second audio segment 418 may be muted, skipped, or otherwise altered during presentation.

The media delivery module 102 may thereafter present third audio data 422 of a third media item. Using the modified detection data 420, the audio content detection module 112 may detect the selected content 406 within the third audio data 422, thus possibly causing the audio content detection module 112 to alter the presentation of the selected content 406 in its entirety. Subsequent instances of the selected content 406 in the third media item, as well as subsequent media items, may be altered in a manner similar to that described above.

Figure 5:
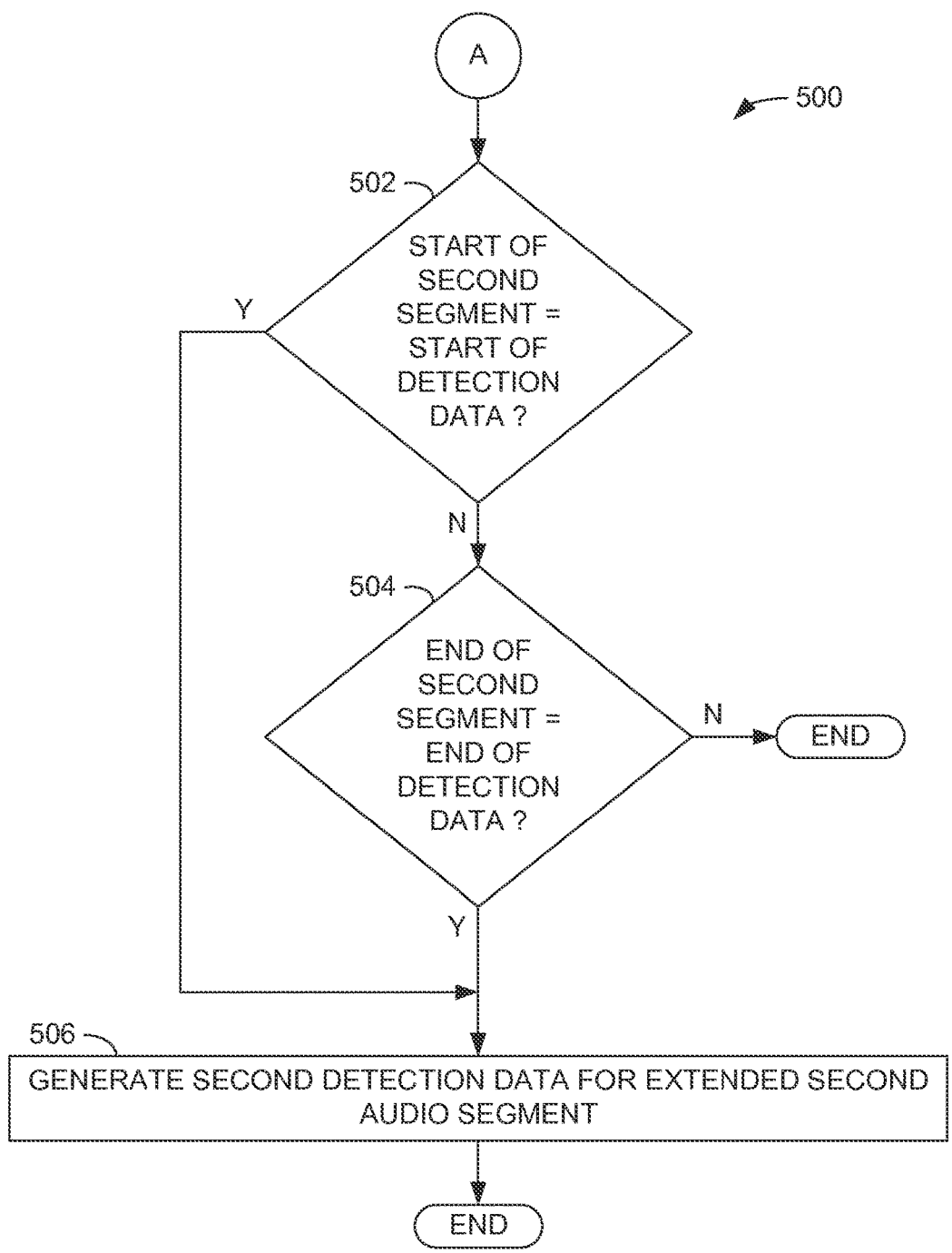
FIG. 5 is a flow diagram of an example method of modifying the presentation of a media item, in which initial audio detection data does not encompass an entire selected content portion.

In the example of FIG. 4, the detection data 410 encompasses all of the selected content 406 that the user intended to have altered by way of the user indication 404. Oppositely, FIG. 5 is a flow diagram of an example method 500 of modifying the presentation of a media item, in which initial audio detection data does not encompass an entirety of a selected content portion. For example, presuming a second audio segment of a second media item that corresponds with the user indication has been detected using the detection data generated from a first media item, as described in method 200 of FIG. 2 at operations 210 and 212, the audio content detection module 112 may determine whether the beginning of the second audio segment coincides with the start of the detection data (operation 502), or if the end of the second audio segment coincides with the end of the detection data (operation 504). If so, the audio content detection module 112 may generate second audio detection data for an extended version of the second audio segment (operation 506). For example, if the beginning of the second audio segment coincides with the start of the detection data, the audio content detection module 112 may extend the second audio segment to include a portion of the second audio data that immediately precedes the current second audio segment. Similarly, if the end of the second audio segment coincides with the end of the detection data, the audio content detection module 112 may extend the second audio segment to include a portion of the second audio data that immediately follows the current second audio segment.

Figure 6:
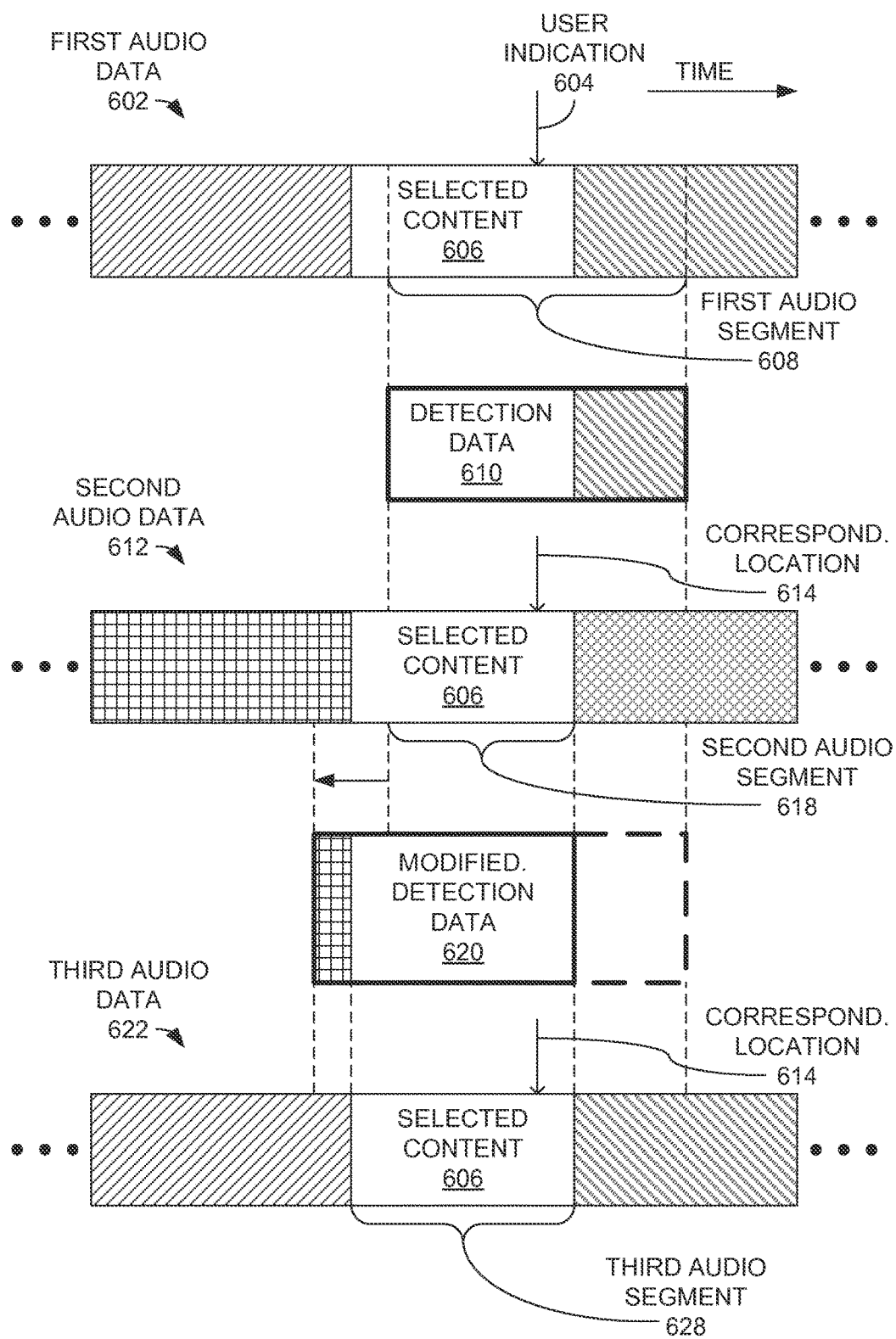
FIG. 6 is a timing diagram depicting the modification of the presentation of a media item based on the example method of FIG. 5, in which the initial detection data does not encompass a beginning of the selected content portion.

FIG. 6 is a timing diagram depicting the modification of the presentation of a media item based on the example method of FIG. 5, in which the initial detection data does not encompass a beginning of the selected content portion. In this scenario, the user interface module 104 receives a user indication 604 toward the end of the selected content 606 of first audio data 602 of a first media item. Consequently, the detection data generator 106 may generate detection data 610 that does not include an initial portion of the selected content 606, and includes more unselected content that is presented immediately after the selected content 606 in the first media item.

Thereafter, the audio content detection module 112 may compare second audio data 612 of a second media item to the detection data 610, thus matching a second audio segment 618 with a portion of the selected content 606, but missing an initial portion of the selected content 606. Additionally, the audio content detection module 112 may alter the presentation of at least a portion of the second audio segment 618, as discussed above. In this case, the audio content detection module 112 may determine that a corresponding location 614 of the second audio segment 618 aligns with the user indication 604 of the selected content 606 represented in the detection data 610, but also determines that the beginning of the second audio segment 618 aligns with the beginning of the detection data 610, thus potentially indicating that some initial portion of the selected content 606 is not being detected.

Accordingly, the audio content detection module 112 may then extend the detection data 610 to include a portion of the second audio data 612 that immediately precedes the second audio segment 618, resulting in modified detection data 620. In some examples, a portion of the detection data 610 following the matching selected content 606 may be removed from the modified detection data 620, presuming the audio content detection module 112 notes that the trailing end of the modified detection data 620 need not be extended in the future.

The media delivery module 102 may thereafter provide a third media item including third audio data 622 for presentation to the user. The audio content detection module 112 may then detect the entirety of the selected content 606 within the third audio data 622 as a third audio segment 628 based on the modified detection data 620. Since the beginning of the portion of the third audio segment 628 does not align with the beginning of the modified detection data 620, the audio content detection module 112 may determine that the entirety of the selected content 606 has been detected, and may then trim the modified detection data 620 to match the third audio segment 628, and possibly store the newly-modified detection data 620 in the audio segment blacklist 110 via the detection data storage module 108. Also, the audio content detection module 112 may alter the presentation of the entire selected content 606 to the user.

Figure 7:
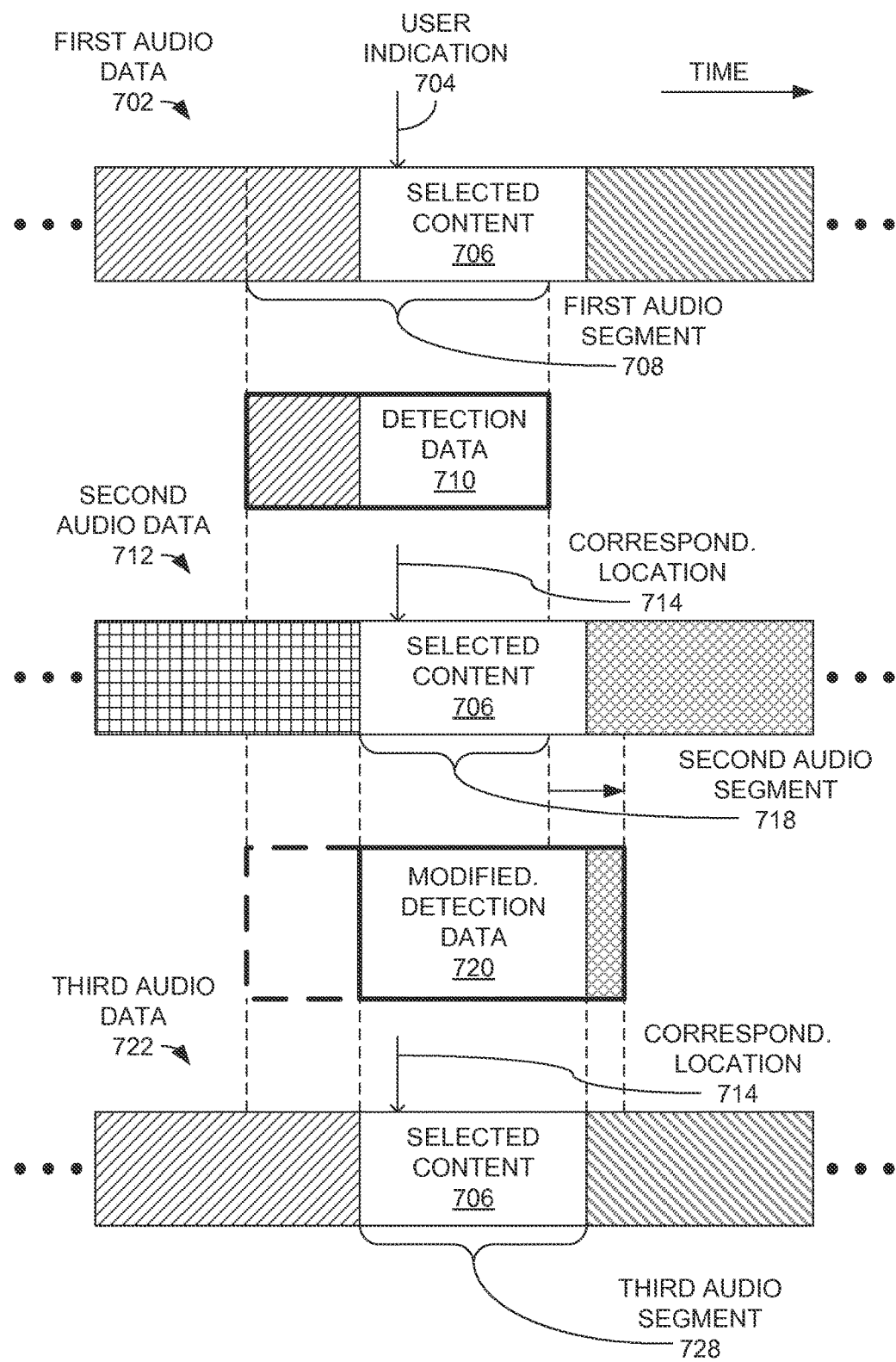
FIG. 7 is a timing diagram depicting the modification of the presentation of a media item based on the example method of FIG. 5, in which the initial detection data does not encompass an end of the selected content portion.

Similarly, FIG. 7 is a timing diagram depicting the modification of the presentation of a media item based on the example method of FIG. 5, in which initial detection data does not encompass an end of a selected content portion. In this case, the user interface module 104 receives a user indication 704 toward the beginning of the selected content 706 of first audio data 702 of a first media item. Consequently, the detection data generator 106 may generate detection data 710 that does not include an ending portion of the selected content 706, and includes more unselected content that is presented immediately before the selected content 706 in the first media item.

Thereafter, the audio content detection module 112 may compare second audio data 712 of a second media item to the detection data 710, thus matching a second audio segment 718 with a portion of the selected content 706, but missing an ending portion of the selected content 706. Further, the audio content detection module 112 may alter the presentation of at least a portion of the second audio segment 718, as described above. In this scenario, the audio content detection module 112 may determine that a corresponding location 714 of the second audio segment 718 aligns with the user indication 704 of the selected content 706 represented in the detection data 710, but also determines that the end of the second audio segment 718 aligns with the end of the detection data 710, thus potentially indicating that some ending portion of the selected content 706 was not detected.

Accordingly, the audio content detection module 112 may then extend the detection data 710 to include a portion of the second audio data 712 that immediately follows the second audio segment 718, resulting in modified detection data 720. In some examples, a portion of the detection data 710 preceding the matching selected content 706 may be removed from the modified detection data 720, presuming the audio content detection module 112 notes that the starting portion of the modified detection data 720 need not be extended thereafter.

The media delivery module 102 may then provide a third media item including third audio data 722 for presentation to the user. The audio content detection module 112 may then detect the entirety of the selected content 706 within the third audio data 722 as a third audio segment 728 based on the modified detection data 720. Since the end of the portion of the third audio segment 728 does not align with the end of the modified detection data 720, the audio content detection module 112 may determine that the entirety of the selected content 706 has been detected, and may then trim the modified detection data 720 to match the third audio segment 728, and then store the newly-modified detection data 720 in the audio segment blacklist 110 via the detection data storage module 108. Also, the audio content detection module 112 may alter the presentation of the entire selected content 706 to the user.

In some situations, less than all of a selected content portion of a media item may be presented to the user around the time a user indication is received. For example, the user may have just changed channels from a previous media item to a current media item that is presently displaying content objectionable to the user. In response, the user may provide an indication to the media presentation system 100 marking the current portion of content for subsequent alteration. Accordingly, the media presentation system 100 may be configured to determine the extent of the selected content using subsequent instances of the selected content to facilitate alteration of the presentation of the selected content.

Figure 8:
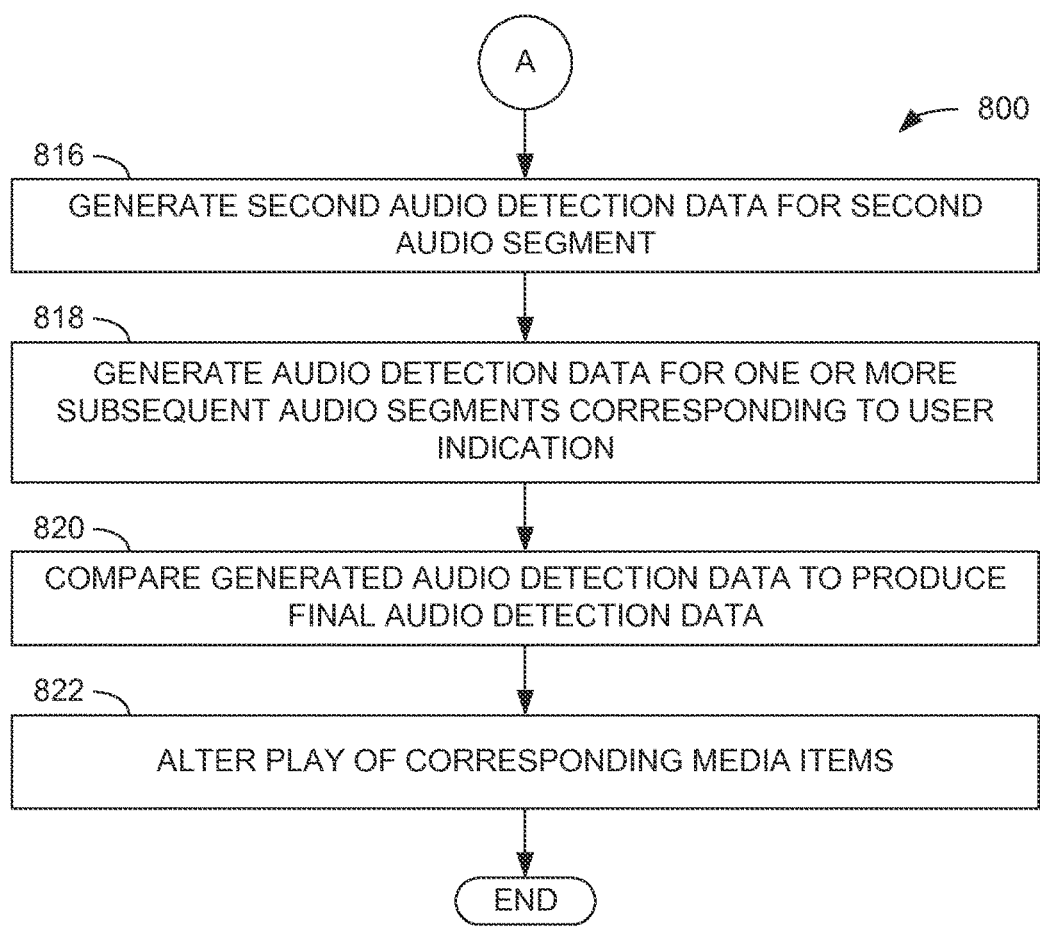
FIG. 8 is a flow diagram of an example method of modifying the presentation of a media item, in which detection data for multiple instances of audio data are generated and compared to produce final audio detection data.

To that end, FIG. 8 is a flow diagram of an example method 800 of modifying the presentation of a media item, in which detection data for multiple instances of audio data are generated and compared to produce final audio detection data. As presented in FIG. 8, the method 800, in one example, may presume a second audio segment of a second media item that corresponds with the user indication has been detected using the detection data generated from a first media item, as described in method 200 of FIG. 2 at operations 210 and 212. Thereafter, the audio content detection module 112 may generate second audio detection data for the second audio segment (operation 816), as opposed to modifying the first audio detection data generated from the first audio segment. Additionally, such audio detection data may be generated for each of one or more subsequent audio segments that correspond to the user indication received during the first media item (operation 818). Accordingly, several instances of audio detection data may be generated or captured and stored in response to detecting at least a portion of the selected content denoted by the user indication.

After a number of instances of audio detection data associated with a particular user selection are generated, the instances may be compared to produce final detection data (operation 820). For example, two or more of the detection data instances may be merged such that a maximum amount of detection data relating to the selected content may reside within a single detection data instance. In other examples, one or more of the detection data instances may be deleted, or may be replaced by another detection data instance, if the detection data it holds relative to the selected content is completely encompassed by the other detection data instance. Once a particular detection data instance is generated or produced that encompasses the entire selected content, the particular detection data instance may be trimmed to produce the final detection data for the selected content, and possibly stored as an entry in the audio segment blacklist 110 via the detection data storage module 108. At least after the generation of the final detection data, and possibly after the generation of one of the detection data instances, the audio content detection module 112 may alter the presentation of at least a portion of the selected content via the final detection data (operation 822).

Figure 9:
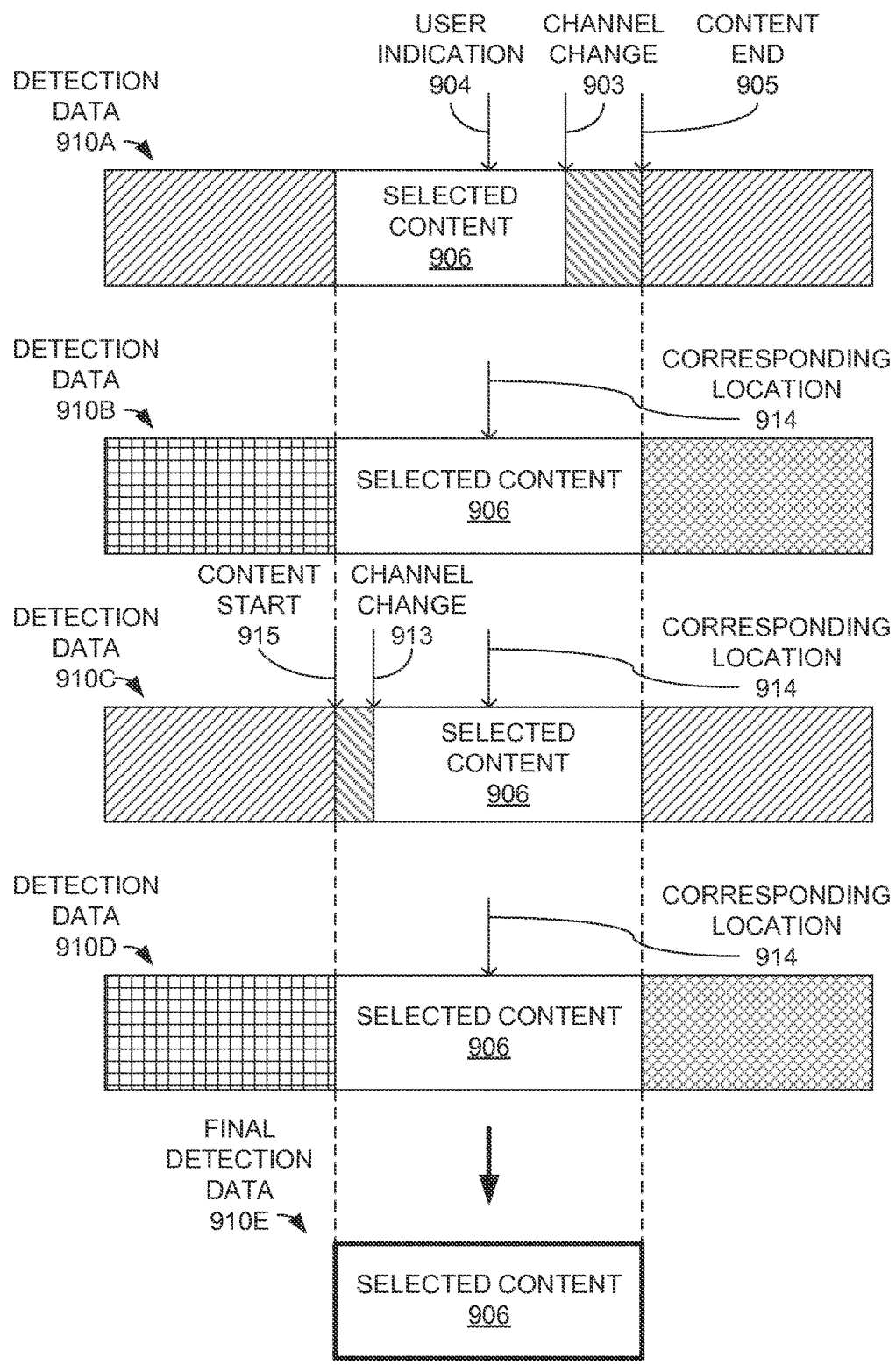
FIG. 9 is a timing diagram depicting the producing of the final audio detection data based on the example method of FIG. 8.

FIG. 9 is a timing diagram depicting the producing of the final audio detection data based on the example method 800 of FIG. 8. As shown in FIG. 9, first detection data 910A represents a portion of selected content 906 denoted by way of a user indication 904 received during the presentation of the selected content 906 in a first media item. However, a channel change 903 occurred prior to the end 905 of the selected content 906 being presented, resulting in less than all of the selected content 906 being reflected in the first detection data 910A. Thereafter, second detection data 910B may be generated based on the selected content 906 being detected in another media item at a corresponding location 914 associated with the user indication 904 received during the first media item. Also, third detection data 910C is generated in response to the selected content 906 being detected in a third media item. For example, the selected content 906 in the third media item may be detected based on either the first detection data 910A or the second detection data 910B. In this instance, the user may have switched from a first channel to second channel such that a start 915 of the selected content 906 was not captured due to a channel change 913 occurring after the content start 915, resulting in an initial portion of the selected content 906 not be represented in the third detection data 910C. In another example, fourth detection data 910D is generated in which an entirety of the selected content 906 is represented therein.

Based on the four detection data 910A-910D instances that have been generated, the audio content detection module 112 may generate final detection data 910E. For example, the audio content detection module 112 may determine on the basis of the second detection data 910B and the fourth detection data 910D including the same amount of the selected content 906 represented therein, and on the basis that the first detection data 910A and the third detection data 910C each represent less than the selected content 906, that an entirety of the selected content 906 is present in both the second detection data 910B and the fourth detection data 910D, thus selecting either of these detection data instances for further processing. Presuming the audio content detection module 112 selects the fourth detection data 910D for additional processing, the audio content detection module 112 may trim leading and trailing portions of the fourth detection data 910D so that only the portion of the fourth detection data 910D that matches the second detection data 910B remains. Thereafter, the audio content detection module 112 may store the final detection data 910E in the audio segment blacklist 110 via the detection data storage module 108 to alter subsequent instances of the selected content 906 in media items presented to the user.

To aid the media presentation system 100 in detecting an entirety of selected content, the user may provide additional input to notify the media presentation system 100 that less than all of the selected content is being altered. For example, the user may notice that a particular commercial for which the user had previously provided a user indication is only being muted for a portion of the commercial. As a result, the user may provide a second user indication during the selected content. In response, in one example, the detection data generator 106 may generate an additional instance of detection data that encompasses a point in time corresponding to the second user indication, similar to one of the instances of detection data instances 910B-910D depicted in FIG. 9. The audio content detection module 112 may then compare the additional detection data instance with one or more data detection instances previously generated to produce the final detection data 910E of FIG. 9.

In some embodiments, a user may selectively remove entries from the audio segment blacklist 110 to allow the corresponding selected content to be presented to the user once again without alteration (e.g., unmuted). For example, a user may provide an additional user indication during a time when presentation to the user of the selected content is being altered (e.g., muted). In response, the media presentation system 100, via the detection data storage module 108, may remove the detection data associated with the selected content from the audio segment blacklist 110. To place detection data for the selected contact back onto the audio segment blacklist 110, the user may only need to provide another user indication during a subsequent presentation of that same content, as described more fully above.

In other examples, the media presentation system 100, via the detection data storage module 108, may automatically remove or "age out" one or more entries of the audio segment blacklist 110. For example, the detection data storage module 108 may automatically remove a particular entry from the audio segment blacklist 110 based on that entry not having been matched successfully against incoming audio data for some predetermined period of time. In some examples, the detection data storage module 108 may remove one or more entries of the audio segment blacklist 110, such as the oldest entry or entries, based on some other criterion, such as the size of the audio segment blacklist 110 reaching some predetermined threshold. Aging out entries of the audio segment blacklist 110 in such a manner may reduce the overall amount of storage necessary for the audio segment blacklist 110, and may also reduce the amount of processing necessary to compare the entries of the audio segment blacklist 110 against the audio data being presented to the user.

In some embodiments, the audio segment blacklist 110 may be associated with a particular user. Further, the media presentation system 100 may maintain a separate audio segment blacklist 110 for each different user of the media presentation system 100. Accordingly, the media presentation system 100 may allow a user to sign in, log on, or otherwise indicate to the media presentation system 100 that a particular user is currently using the system 100. In response to identifying the current user, the audio content detection module 112 may employ an audio segment blacklist 110 that includes detection data for one or more items of selected content that the current user has previously marked for alteration (e.g., muting, skipping, etc.). Additionally, the audio segment blacklist 110 for a particular user, or the information included therein, may be shared with other media presentation devices or systems (e.g., computer tablets, smart phones, and so on) so that the user may employ the same detection data on multiple devices to alter the presentation of objectionable content. Also, the media presentation system 100 may receive detection data from the other devices and store the relevant information to the audio segment blacklist 110 for use in the media presentation system 100.

In at least some of the embodiments described above, a media presentation system may facilitate the marking or selection of content by a user for special presentation treatment, such as reducing the audio volume, muting, or skipping of the selected content. The user selection may be in the form of a simple, singular input or indication provided by the user to the media presentation system while the content to be selected is be played or presented to the user. By then generating detection data for detecting subsequent presentations of that same selected content, the media presentation system may detect a true extent of the selected content by comparing the subsequent presentations of the selected content to the detection data. Moreover, the media presentation system may refine the detection data for the selected content based on those subsequent presentations. In some examples, the user may allow the selected content to once again be presented or played without alteration by merely providing a similar user indication while the selected content is being muted or similarly altered.

Figure 10:
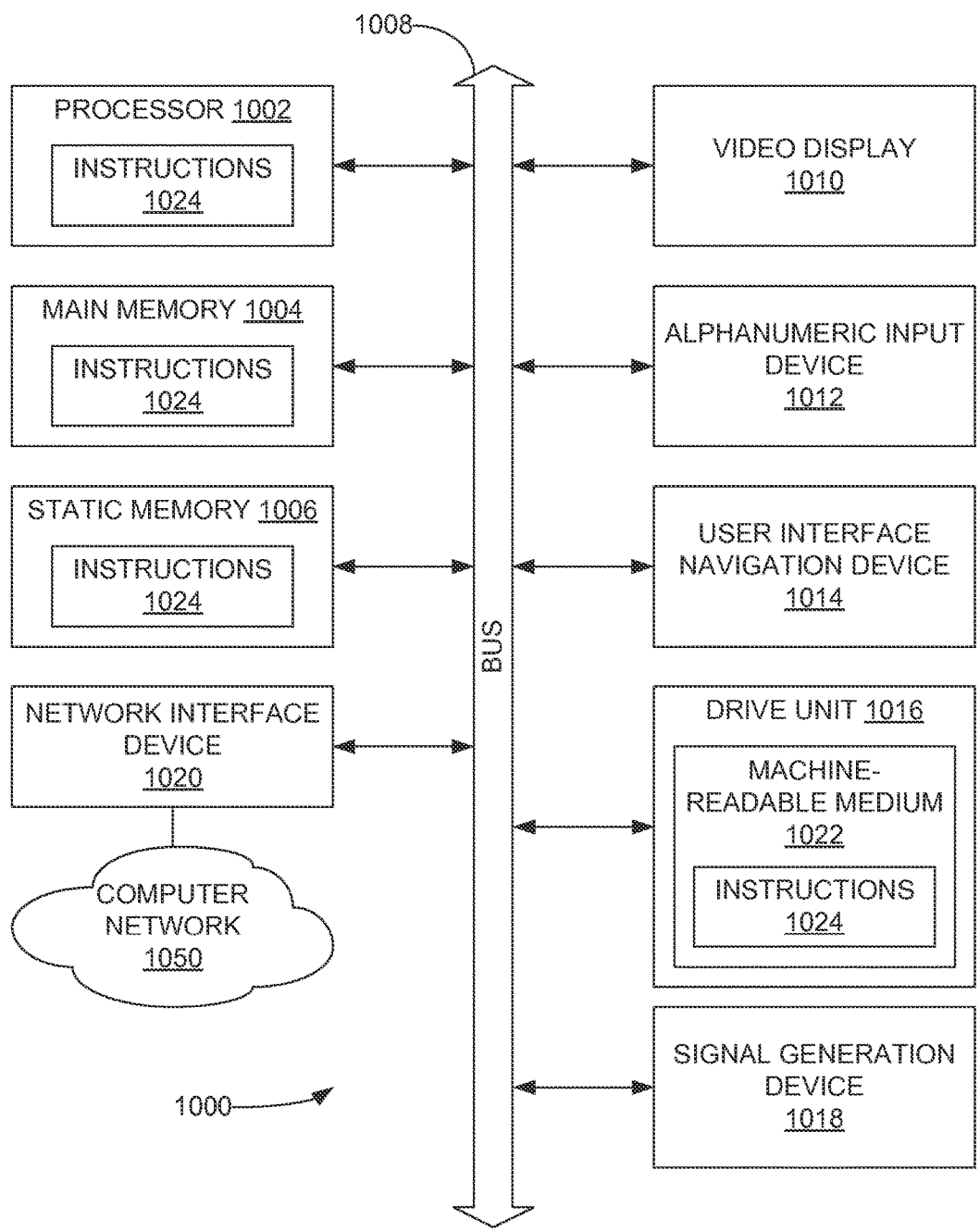
FIG. 10 is a diagrammatic representation of a machine in the example form of a computer system within which a set of instructions may be executed for causing the machine to perform any one or more of the methodologies discussed herein.

FIG. 10 illustrates a diagrammatic representation of a machine in the example form of a computer system 1000 within which a set of instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer, a tablet computer, a set-top box (STB), a personal digital assistant (PDA), a cellular telephone, a web appliance, a network router, switch or bridge, or any machine capable of executing a set of instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU) or both), a main memory 1004 and a static memory 1006 which communicate with each other via a bus 1008. The computer system 1000 may further include a video display 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker), and a network interface device 1020.

The disk drive unit 1016 includes a machine-readable medium 1022 on which is stored one or more sets of instructions and data structures (e.g., instructions 1024) embodying or utilized by any one or more of the methodologies or functions described herein. The instructions 1024 may also reside, completely or at least partially, within the static memory 1006, within the main memory 1004, and/or within the processor 1002 during execution thereof by the computer system 1000, the static memory 1006, the main memory 1004, and the processor 1002 also constituting machine-readable media.

The instructions 1024 may further be transmitted or received over a computer network 1050 via the network interface device 1020 utilizing any one of a number of well-known transfer protocols (e.g., HyperText Transfer Protocol (HTTP)).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding or carrying a set of instructions 1024 for execution by the machine and that cause the machine to perform any one or more of the methodologies of the present inventive subject matter, or that is capable of storing, encoding or carrying data structures utilized by or associated with such a set of instructions 1024. The term "machine-readable medium" shall accordingly be taken to include, but not be limited to, solid-state memories, and optical and magnetic media.

Throughout this specification, plural instances may implement components, operations, or structures described as a single instance. Although individual operations of one or more methods are illustrated and described as separate operations, one or more of the individual operations may be performed concurrently, and the operations may be performed in an order other than that illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" (or, alternatively, "module") should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values." "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing." "calculating." "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments include more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of media presentation modification comprising:
   playing a first media item comprising first audio data;
   receiving, at a point in time during the playing of the first media item, an input;
   generating, in response to the receiving of the input, detection data for a first audio segment of the first audio data, wherein the first audio segment begins at a first predetermined length of time before the point in time and ends at a second predetermined length of time after the point in time, and wherein a location in the detection data corresponds to the point in time;
   playing, after the playing of the first media item, a second media item comprising second audio data;
   detecting, in the second audio data based on the detection data, by at least one hardware processor, a second audio segment corresponding to at least a portion of the first audio segment;
   determining that a second location in the second audio segment corresponds to the location in the detection data by comparing a portion of the detection data corresponding to the location to data representing the second audio segment;
   based on a determination that a first portion of the second audio segment is not represented in the detection data, extending the detection data to include data representing the first portion of the second audio segment; and
   based on the determination that the second location in the second audio segment corresponds to the location in the detection data, altering the playing of the second media item during at least a second portion of the second audio segment.

2. The method of claim 1, wherein:
   the portion of the second audio segment that is not represented in the detection data is a beginning of the second audio segment.

3. The method of claim 1, further comprising:
   playing, after the playing of the second media item, a third media item, wherein the third media item comprises third audio data;
   detecting, in the third audio data based on the detection data, a third audio segment corresponding to the second audio segment; and
   altering the playing of the third media item during the third audio segment.

4. The method of claim 3, wherein the altering of the playing of the third media item during the third audio segment comprises altering the playing of the third media item throughout an entirety of the third audio segment.

5. The method of claim 1, wherein the detection data comprises acoustic fingerprint data for the first audio segment.

6. The method of claim 1, wherein the first audio segment comprises a portion of the first audio data centered about the point in time at which the input was received.

7. The method of claim 1, wherein:
   the portion of the second audio segment that is not represented in the detection data is an end of the second audio segment.

8. The method of claim 1,
   further comprising:
   playing, after the playing of the second media item, a third media item, wherein the third media item comprises third audio data;
   detecting, in the third audio data based on the detection data, a third audio segment corresponding to at least a portion of the first audio segment;
   determining whether a third location in the third audio segment corresponds to the location in the detection data;
   generating second detection data for the third audio segment of the third audio data;
   comparing the detection data and the second detection data;
   generating final detection data based on the comparing of the detection data and the second detection data; and
   altering, based on the final detection data, the playing of a subsequent media item during at least a portion of the subsequent media item.

9. The method of claim 1, wherein:
   the input comprises a first input; and
   the method further comprises:
   playing, after the playing of the second media item, a third media item, wherein the third media item comprises third audio data;
   detecting, in the third audio data based on the detection data, a third audio segment corresponding to at least a second portion of the first audio segment;
   altering the playing of the third media item during at least a portion of the third audio segment;
   receiving, during the altering of the playing of the third media item, a second input; and
   ceasing, in response to the receiving of the second input, the altering of the playing of the third media item.

10. The method of claim 1, wherein:
the generating of the detection data for the first audio segment of the first audio data is by a first media presentation device;
the altering of the playing of the second media item is by a second media presentation device; and
the method further comprises:
sending, from the first media presentation device to the second media presentation device, the detection data.

11. A non-transitory computer-readable storage device storing instructions that, when executed by at least one processor of a machine, cause the machine to perform operations comprising:
playing a first media item comprising first audio data;
receiving, at a point in time during the playing of the first media item, an input;
generating, in response to the receiving of the input, detection data for a first audio segment of the first audio data, wherein the first audio segment begins at a first predetermined length of time before the point in time and ends at a second predetermined length of time after the point in time, and wherein a location in the detection data corresponds to the point in time;
playing, after the playing of the first media item, a second media item comprising second audio data;
detecting, in the second audio data based on the detection data, a second audio segment corresponding to at least a portion of the first audio segment;
determining that a second location in the second audio segment corresponds to the location in the detection data by comparing a portion of the detection data corresponding to the location to data representing the second audio segment;
based on a determination that a first portion of the second audio segment is not represented in the detection data, extending the detection data to include data representing the portion of the second audio segment; and
based on the determination that the second location in the second audio segment corresponds to the location in the detection data,
altering, in response to the second location in the second audio segment corresponding to the location in the detection data, the playing of the second media item during at least a second portion of the second audio segment.

12. A media presentation system comprising:
one or more hardware processors; and
a memory storing instructions that, when executed by at least one of the one or more hardware processors, causes the media presentation system to perform operations comprising:
playing a first media item comprising first audio data;
receiving, at a point in time during the playing of the first media item, an input; and
generating, in response to the receiving of the input, detection data for a first audio segment of the first audio data, wherein the first audio segment begins at a first predetermined length of time before the point in time and ends at a second predetermined length of time after the point in time, and wherein a location in the detection data corresponds to the point in time;
playing, after the playing of the first media item, a second media item comprising second audio data;
detecting, in the second audio data based on the detection data, a second audio segment corresponding to at least a portion of the first audio segment;
determining that a second location in the second audio segment corresponds to the location in the detection data by comparing a portion of the detection data corresponding to the location to data representing the second audio segment;
based on a determination that a first portion of the second audio segment is not represented in the detection data, extending the detection data to include data representing the portion of the second audio segment; and
based on the determination that the second location in the second audio segment corresponds to the location in the detection data, altering, in response to the second location in the second audio segment corresponding to the location in the detection data, the playing of the second media item during at least a second portion of the second audio segment.

13. The media presentation system of claim 12, wherein a device comprises the media presentation system, and wherein the device is selected from a group consisting of a media gateway, a television set-top box, a personal video recorder, a gaming system, a content streaming device, a television, a desktop computer, a laptop computer, a tablet computer, a smart phone, and a personal digital assistant.

14. The media presentation system of claim 12, wherein an audio amplification system comprises the media presentation system.

15. The media presentation system of claim 12, wherein the altering of the playing of the second media item comprises muting at least the second portion of the second audio segment.

16. The media presentation system of claim 12, wherein the altering of the playing of the second media item comprises reducing an audio volume of at least the second portion of the second audio segment.

17. The media presentation system of claim 12, wherein the altering of the playing of the second media item comprises skipping at least the second portion of the second media item.

18. The media presentation system of claim 12, wherein the altering of the playing of the second media item comprises altering the playing of the second media item from the second location in the second media item to a third location in the second media item corresponding to an end of the second audio segment.

\* \* \* \* \*